United States Patent
Mathews et al.

(10) Patent No.: US 9,031,896 B2
(45) Date of Patent: May 12, 2015

(54) PROCESS ANALYSIS

(75) Inventors: George Morgan Mathews, Bristol (GB); David Nicholson, Bristol (GB); Mark Lawrence Williams, Bristol (GB); Andrew Peter Henry McCabe, Wotton-under-Edge (GB)

(73) Assignee: BAE SYSTEMS plc (GB)

( * ) Notice: Subject to any disclaimer, the term of this patent is extended or adjusted under 35 U.S.C. 154(b) by 211 days.

(21) Appl. No.: 13/635,562

(22) PCT Filed: Mar. 4, 2011

(86) PCT No.: PCT/GB2011/050436
§ 371 (c)(1),
(2), (4) Date: Sep. 17, 2012

(87) PCT Pub. No.: WO2011/114129
PCT Pub. Date: Sep. 22, 2011

(65) Prior Publication Data
US 2013/0013551 A1 Jan. 10, 2013

(30) Foreign Application Priority Data
Mar. 15, 2010 (GB) .................................. 1004226.5

(51) Int. Cl.
G06F 9/44 (2006.01)
G06N 7/02 (2006.01)
G06N 7/06 (2006.01)
G06N 7/00 (2006.01)
G06N 5/04 (2006.01)
G06Q 10/00 (2012.01)

(52) U.S. Cl.
CPC ................ *G06N 7/005* (2013.01); *G06N 5/048* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 6,415,276 B1 * | 7/2002 | Heger et al. ..................... | 706/52 |
| 2005/0246307 A1 | 11/2005 | Bala | |
| 2008/0235172 A1 * | 9/2008 | Rosenstein et al. ............. | 706/46 |
| 2008/0278334 A1 | 11/2008 | Friedlander et al. | |

(Continued)

FOREIGN PATENT DOCUMENTS

| | | |
|---|---|---|
| EP | 2 059 893 A2 | 5/2009 |
| WO | WO 2008/029126 A2 | 3/2008 |

OTHER PUBLICATIONS

A Tutorial on Bayesian Belief Networks Mark L Krieg Published by DSTO Electronics and Surveillance Research Laboratory PO Box 1500 Edinburgh, South Australia, Australia 5111 Dec. 2001.*

(Continued)

*Primary Examiner* — Kakali Chaki
*Assistant Examiner* — Luis Sitiriche
(74) *Attorney, Agent, or Firm* — Finch & Maloney PLLC

(57) ABSTRACT

An apparatus and method are disclosed for analysing a process. An exemplary method includes: generating a process template; and determining a probabilistic model specifying the process template. The method can include use of task nodes for tasks of the process; observables nodes for observables that may be caused by performance of the tasks; and a background activities node, wherein observables may further be caused by background activities of the background node. The method can include use of task nodes for tasks of the process; observables nodes for observables that may be caused by performance of the tasks; and a background activities node, observables may further be caused by background activities of the background node. The method can include measuring values of an observable corresponding to one of the observables nodes; and updating a probabilistic estimate of the process state using the measured values.

14 Claims, 5 Drawing Sheets

(56) References Cited

U.S. PATENT DOCUMENTS

2009/0106734 A1    4/2009  Riesen et al.
2009/0171879 A1*   7/2009  Bullen et al. .................... 706/47
2012/0022844 A1*   1/2012  Teixeira ......................... 703/11
2012/0277545 A1*  11/2012  Teixeira ......................... 600/301

OTHER PUBLICATIONS

International Search Report (PCT/ISA/210) issued on May 23, 2011, by the United Kingdom Patent Office as the International Searching Authority for International Application No. PCT/GB2011/050436.

United Kingdom Search Report issued on Jul. 7, 2010 for Application No. GB 1004226.5.

George M. Mathews et al., "Plan Detection Under Partially Observable and Cluttered Conditions", BAE Systems, Advanced Technology Centre, Filton, U.K., 8 pages.

Notification Concerning Transmittal of International Preliminary Report on Patentability (Forms PCT/IB/326 and PCT/IB/373) and the Written Opinion of the International Searching Authority (Form PCT/ISA/237) dated Sep. 27, 2012, issued in corresponding International Application No. PCT/GB2011/050436. (7 pages).

* cited by examiner

PROCESS ANALYSIS

FIELD OF THE INVENTION

The present invention relates to process analysis, process monitoring, process detection, and the like.

BACKGROUND

It is known to analyse, monitor and detect processes. One scenario where this is performed is when the process comprises a military enemy or terrorist group making preparations for an attack. In such a situation, the party performing the analysis of the process is different to the party implementing the process. By virtue of the nature of the process, the party performing the analysis is not able to fully observe or detect all elements of the process, for example due to other activities not forming part of the process being observed as well as activities that are part of the process. As such, the process may be considered as being partially observable, and executed in a cluttered, environment. Also, the party performing the analysis may not know all the intended steps or elements of the process or their timings. Also, the party performing the analysis may not know whether the process to be analysed is actually underway.

The present inventor has realised it would be desirable to provide a process of process analysis which tends to accommodate or alleviate one or more of the following aspects: (i) the process being partially observable, (ii) the process being performed in a cluttered, environment; (iii) incomplete knowledge of the process being analysed; and (iv) incomplete knowledge of if/when the process to be analysed may start.

SUMMARY OF THE INVENTION

In a first aspect, the present invention provides a method of analysing a process, the method comprising generating a process template, determining a probabilistic model of the process, the probabilistic model specifying the process template, wherein the probabilistic model comprises: a plurality of task nodes, the task nodes being nodes for tasks of the process as specified by the process template, a plurality of observables nodes, the observables nodes being nodes for observables that may be caused by performance of the tasks, and a background activities node; wherein one or more of the observables may further be caused by the background activities of the background node; measuring values of an observable corresponding to one of the observables nodes, and updating a probabilistic estimate of the process state using the measured values.

The step of updating the probabilistic estimate of the process state may be performed to estimate a probability that the measured values are caused by the performance of a certain task and/or the background activities.

The step of updating the probabilistic estimate of the process state may be performed to estimate whether or not the process has begun given the measured values.

The step of updating the probabilistic estimate of the process state may be performed to estimate which task is being performed at a time that the measured values are measured.

For at least one of the tasks, for that task to be started it may be required that one of the other tasks is completed.

The step of updating the probabilistic estimate of the process state may be performed using a process of Bayesian inference.

The process of Bayesian inference may be performed using a Monte Carlo inference algorithm.

The step of determining a probabilistic model for the process template may comprise specifying a prior probability distribution for a starting point of the process, specifying a prior probability distribution for each of task nodes, specifying a prior probability distribution for the background activities node, and specifying a prior conditional probability distribution for each of the observables nodes.

A prior probability distribution for a start point of the process may be a probability distribution for the process starting over a time period of interest.

A prior probability distribution for a task node may be a probability distribution for a duration of a task corresponding to the task node.

A prior probability distribution for the background activities node may be a probability that the background activities are taking place over a time period of interest and a duration of the process.

In a further aspect, the present invention provides a method of analysing a process, the method comprising performing the method of any of the above aspects for a plurality of different process templates.

The method may further comprise comparing resulting probabilities obtained from performing the method of any of the above aspects for at least two of the different process templates.

In a further aspect, the present invention provides apparatus for analysing a process, comprising one or more processors adapted to update a probabilistic estimate using measured values of observables, wherein the probabilistic model comprises a plurality of task nodes, the task nodes being nodes for tasks of the process as specified by a process template, a plurality of observables nodes, the observables nodes being nodes for observables that may be caused by performance of the tasks, and a background activities node, wherein one or more of the observables may further be caused by the background activities of the background activities node.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

DETAILED DESCRIPTION

Figure 1:
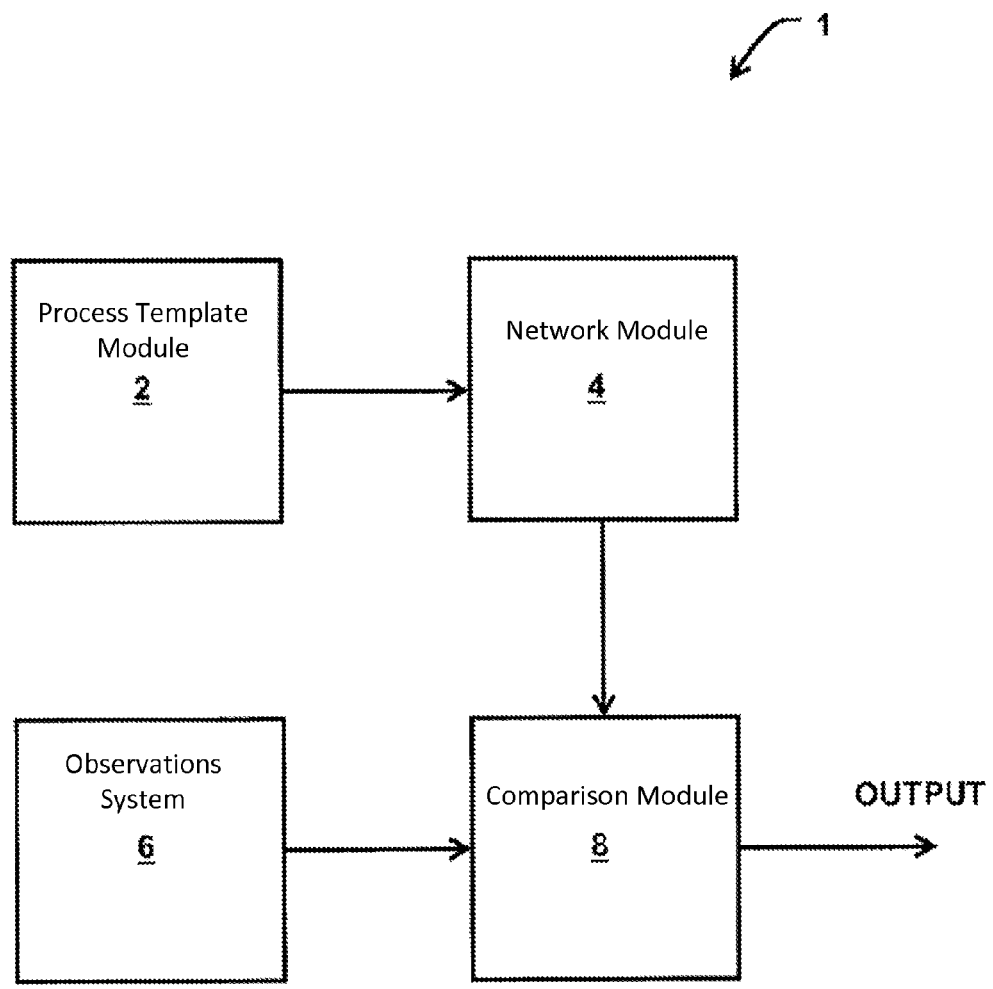
FIG. 1 is a block diagram of a process analysis system.

FIG. 1 is a block diagram of a process analysis system 1 for implementing embodiments of the present invention. The process analysis system is implemented in the form of the following apparatus/functional modules: a process template module 2, a network module 4, an observations system 6, and a comparison module 8. An output of the process template module 2 is coupled to an input of the network module 4. An output of the network module 4 is coupled to an input of the comparison module 8. An output of the observations system is coupled to an input of the comparison module 8. An output of the comparison module 8 provides an output of the overall process analysis system 1.

Figure 2:
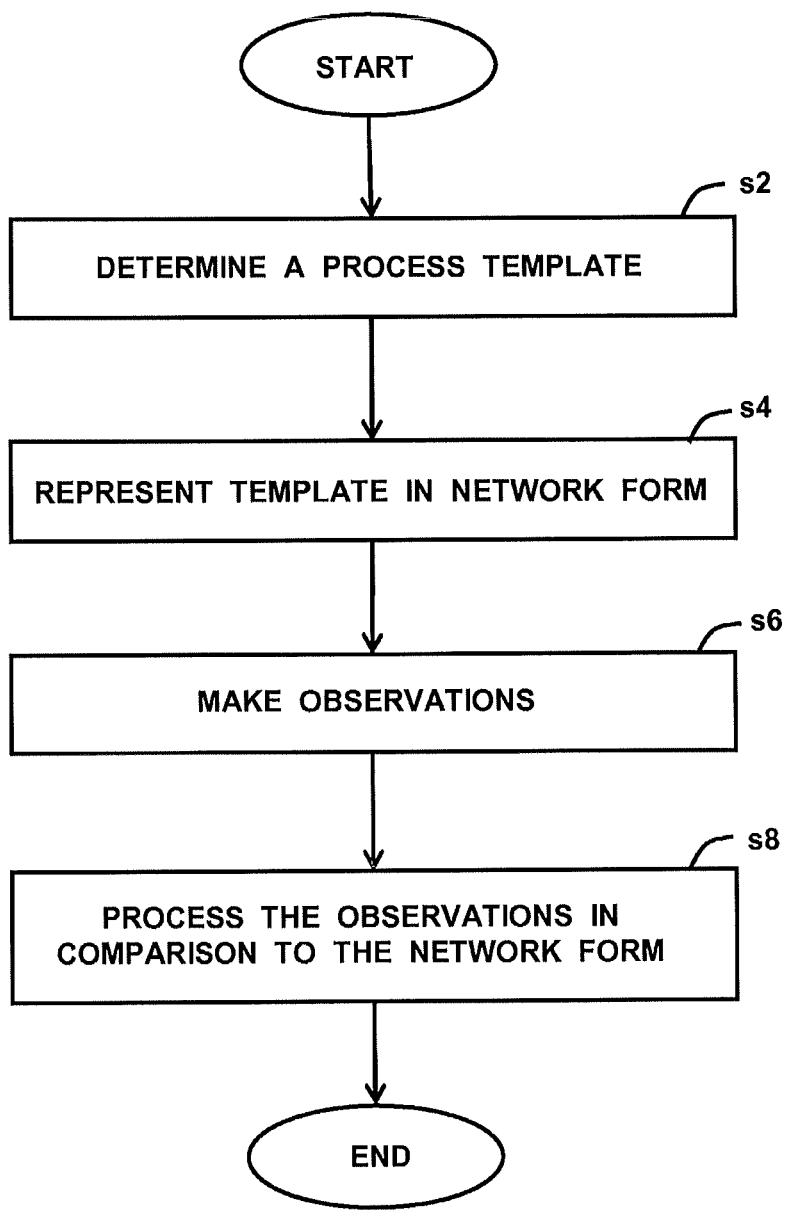
FIG. 2 is a process flow-chart showing certain steps of an embodiment of a process of process analysis, implemented by the process analysis system.

FIG. 2 is a process flow-chart showing certain steps of an embodiment of a process of process analysis, implemented by the process analysis system 1.

At step s2, the process template module 2 determines a process template, and provides the process template to the network module 4. Details of the process template will be described later below with reference to FIG. 3.

At step s4, the network module 4 represents the process template in network form, i.e. in the form of a directed acyclic graph, and provides the network form of the process template to the comparison module 8. Details of the network form will be described later below.

At step s6, the observations system determines physical observations, for example the location of persons or other objects, and provides the observation results to the comparison module 8. Further details will be described later below.

At step s8, the comparison module 8 processes the observation results in comparison to the network form of the process template. Further details of this will be descried later below with reference to FIG. 4 and FIG. 5.

The above described process of process analysis may be performed simultaneously, partially overlapping in time, or temporally sequentially, for a plurality of different template modules.

Apparatus (including any of the following modules individually or in combination: the process template module 2, the network module 4, and the comparison module 8) for performing the above described method steps may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Apparatus for performing the functions of the observations system 6 may be provided by configuring or adapting any suitable apparatus, for example any apparatus for taking observations, measurements and/or readings of physical parameters. Some or all of the functionality of the observations systems 6 may be provided by human beings, sensors, a computer, a network of computers, or one or more processors. In cases in which this apparatus comprises computers and/or processors, said computers/processor may be for implementing instructions and using data, including instructions and data in the form of a computer program or plurality of computer programs stored in or on a machine readable storage medium such as computer memory, a computer disk, ROM, PROM etc., or any combination of these or other storage media. Moreover, in cases in which this apparatus comprises computers and/or processors, said computers/processor, a computer and/or processor may provide some or all of the functionality of the observations system 6 as well as some or all of the functionality of any of the following: the process template module 2, the network module 4, and the comparison module 8.

Figure 3:
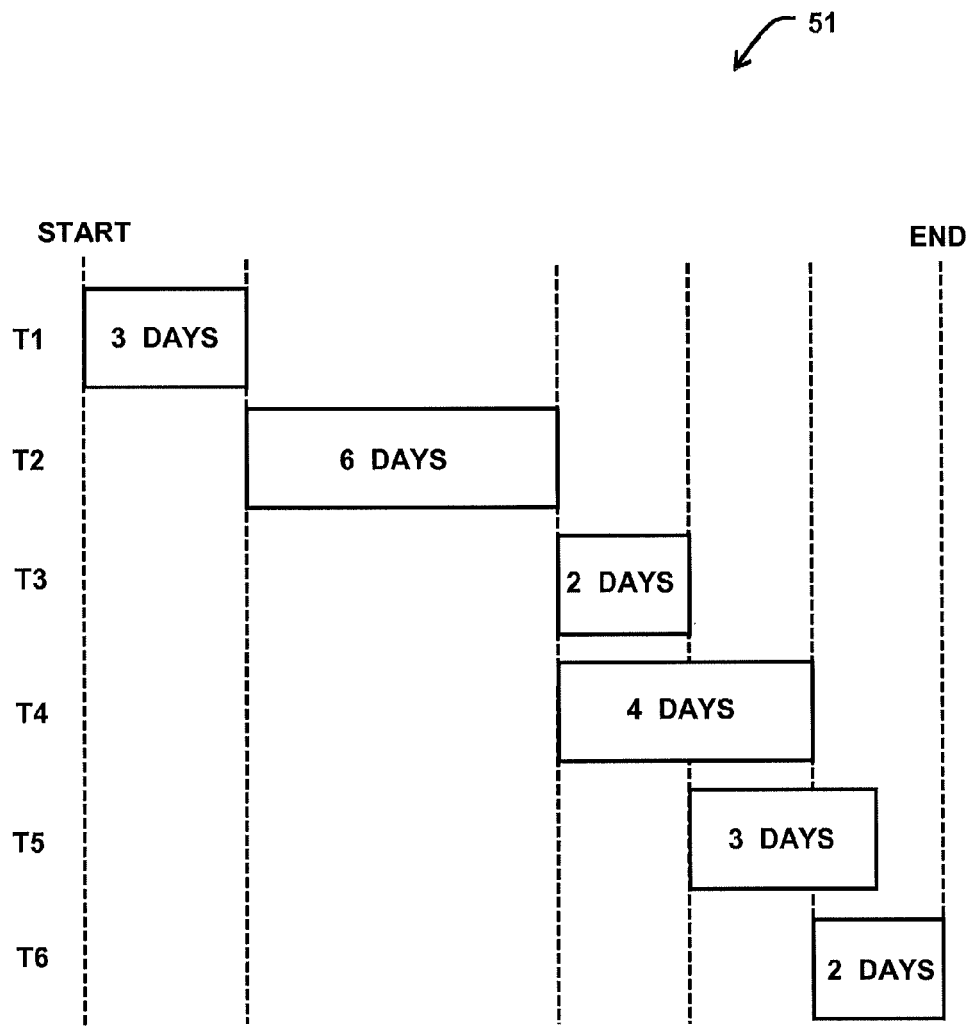
FIG. 3 is a schematic illustration of a process template for a process to be analysed.

FIG. 3 is a schematic illustration of a process template 51 for a process to be analysed. The process template 51 is in the form of a Gantt chart (not to scale). The process template 51 is a template provided as an estimate of a process that it is considered may take place and which is to be analysed. In this embodiment, the process that is to be analysed is that of terrorists preparing an attack, e.g. an ambush. Preferably, many variations of the process template 51 are provided, and each used in the steps described later below, allowing increased chance of successful outcome of the process analysis process, given the templates are only estimates or predictions of the specification of a process that may actually be implemented (in this example, by the terrorists).

In this embodiment, the process template 51 (and any of the many variations thereof) is generated by a domain expert, for example a person having expert knowledge of preparation processes for a terrorist attack. This process template 51 is then input in to the process template module 2. In other embodiments, one or more of the process templates may be generated by any appropriate technique, for example a process template may be generated wholly or in part by an automatic process.

The process template 51 specifies the attack preparation process as comprising six distinct tasks, namely a first task T1, a second task T2, a third task T3, a fourth task T4, a fifth task T5, and a sixth task T6. The process template 51 specifies that each task may only be started once all of the tasks upon which it is dependent are completed. Moreover, each task requires a certain amount of time to complete. Delays between when a prior task finishes (e.g. T1) and a dependent task starts (e.g. T2) can be incorporated by including pseudo tasks that represent this delay.

The first task T1 comprises mobilisation processes, for example initial meetings of the parties involved in elements of the attack preparation process, and/or obtaining of materials and/or equipment for the intended attack. Physical observables include such aspects as the physical locations and movements of one or more persons or other objects, detection of communications links between persons, and so on.

In this embodiment, the process template 51 specifies that the first task T1 is not dependent on any other task in the process. Also, in this embodiment the process template 51 specifies that the first task T1 takes three days to complete.

The second task T2 comprises recruitment processes. In this embodiment, the second task T2 includes the recruitment of gunmen, the recruitment of one or more makers of improvised explosive device (IEDs) or bombs, and the recruitment of any other additional personnel for the attack being prepared. Physical observables include such aspects as the physical locations and movements of one or more persons, detection of communications links between persons, and so on.

In this embodiment, the process template 51 specifies that the second task T2 is dependent on the first task T1, i.e. the recruitment of personnel cannot be started until the planning/ instruction meetings have taken place. Also, in this embodiment the process template 51 specifies that the second task T2 takes six days to complete.

The third task T3 comprises the manufacturing the IEDs. In this embodiment, the third task T3 includes the sourcing of explosives, the sourcing of detonators, and the construction of one or more IEDs. Physical observables include such aspects as the physical locations and movements of one or more persons or other objects, detection of communications links between persons, and so on.

In this embodiment, the process template 51 specifies that the third task T3 is dependent on the second task T2, i.e. the manufacturing of IEDs cannot be started until the recruitment of IED makers and any additional personnel required in the sourcing of materials or IED construction have been recruited. Also, in this embodiment the process template 51 specifies that the third task T3 takes two days to complete.

The fourth task T4 comprises the performing of reconnaissance. In this embodiment, the fourth task T4 includes the choosing of a location at which to perform the ambush, and the monitoring of activity of those being ambushed at or near that location. Physical observables include such aspects as the physical locations and movements of one or more persons or other objects, detection of communications links between persons, and so on.

In this embodiment, the process template 51 specifies that the fourth task T4 is dependent on the second task T2, i.e. reconnaissance processes cannot be started until the recruitment of enough personnel to perform the reconnaissance have been recruited and a knowledge of the number of people available to perform the ambush is known. Also, in this embodiment the process template 51 specifies that the fourth task T4 takes four days to complete.

The fifth task T5 comprises the deployment of the one or more IEDs. In this embodiment, the process template 51 specifies that the fifth task T5 includes the deployment of lookouts, and the deployment of the one or more IEDs at the location identified for the ambush. Physical observables include such aspects as the physical locations and movements of one or more persons or other objects, detection of communications links between persons, and so on.

In this embodiment, the process template 51 specifies that the fifth task T5 is dependent on the third task T2, i.e. the IEDs many only be deployed once they have been manufactured. Also, in this embodiment the process template 51 specifies that the fifth task T5 takes three days to complete.

The sixth task T6 comprises the deployment of any gunmen that are to carry out the ambush. In this embodiment, the sixth task T6 includes the deployment of gunmen at appropriate positions.

In this embodiment, the process template 51 specifies that the sixth task T6 is dependent on the fourth task T4, i.e. the gunmen may only be deployed when the necessary reconnaissance about the convoy routes and relevant dates has been carried out. Also, in this embodiment the process template 51 specifies that the sixth task takes two days to complete.

The process template 51 specifies that after completion of the sixth task T6, the attack preparation process is complete.

Thus, the structure of the process is modelled as a Gantt chart or project plan. This assumes a task T1-T6 can only start once all its dependent tasks are completed. Once started, each task requires a given execution time before it is complete.

The evolution of the process can be completely specified by knowing the start time of the process (i.e. the start time of the first task T1), the dependency structure of the process and the duration of each activity.

In this embodiment, the performance of a task by the party planning the ambush may produce an observable effect. Thus, the activity associated with performing the tasks T1-T6 may be inferred from these observables. However, such effects may also be generated by unrelated background activity.

Figure 4:
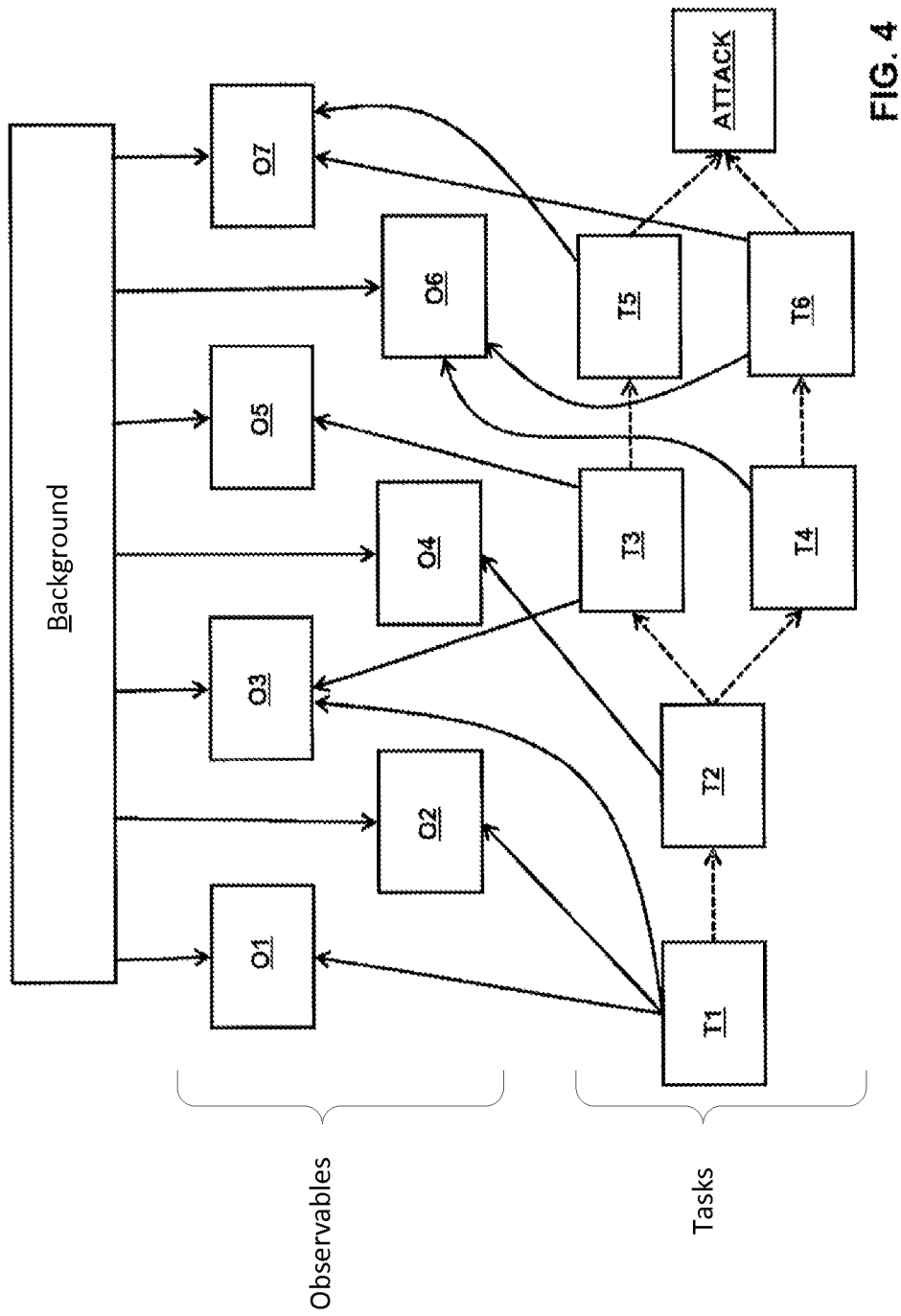
FIG. 4 is a schematic representation of a network form of the process template.

FIG. 4 is a schematic representation of the network form of the process template 51 generated by the network module 4 at step s4 of the process of FIG. 2. The network form of the process template 51 is a directed acyclic graph, the nodes of which represent the six tasks T1-T6 of the process, the unrelated background activity (hereinafter referred to as the "background B") and seven observable random variables (that may be generated by the performance of the tasks T1-T6, or the background B, as described below).

The seven observable random variables are hereinafter referred to as the "first observable O1", the "second observable O2", the "third observable O3", the "fourth observable O4", the "fifth observable O5", the "sixth observable O6", and the "seventh observable O7".

The first observable O1 comprises meeting of parties that may perform or be involved in performing the ambush.

The second observable O2 comprises a suspect financial transfer.

The third observable O3 comprises suspect communications, for example intercepted email or SMS communications, and/or intercepted or overheard telephone conversations.

The fourth observable O4 comprises the reporting of recruitment activities by an informant.

The fifth observable O5 comprises evidence of the smuggling, dealing or theft of arms or explosive materials.

The sixth observable O6 comprises the reporting of suspicious monitoring activity by a patrol.

The seventh observable O7 comprises the reporting of suspicious activity along a roadside.

The solid arrows of the Figure represent causal links between the nodes. For example, a solid arrow pointing from a node (e.g. T1) to a further node (e.g. O1) indicates that the state of the second node is dependent on the state of the first node.

In this embodiment, the first task T1 may give rise to an observation of the first observable O1, the second observable O2, and/or the third observable O3.

In this embodiment, the second task T2 may give rise to an observation of the fourth observable O4.

In this embodiment, the third task T3 may give rise to an observation of the third observable and/or the fifth observable O5.

In this embodiment, the fourth task T4 may give rise to an observation of the sixth observable O6.

In this embodiment, the fifth task T5 may give rise to an observation of the seventh observable O7.

In this embodiment, the sixth task T6 may give rise to an observation of the sixth observable O5 and/or the seventh observable O7.

In this embodiment, the background B may give rise to an observation of the first observable O1, the second observable O2, the third observable O3, the fourth observable O4, the fifth observable O5, the sixth observable O6, and/or the seventh observable O7.

In this embodiment, the process detection algorithm comprises performing Bayesian inference over whether the process is actually being performed and if so, what task schedule best describes the process.

In this embodiment the observables are generated by the execution of the process tasks T1-T6 and or by unrelated background activity (background B). Thus, the state space (i.e. the space of all possible scenarios) over which Bayesian inference is performed consists of the empty set and set of all process scenarios. Mathematically, a state is defined as $x \in X$, where:

$$X = \emptyset \cup R^{N+1}$$

where: R is the set of real numbers;
N is the number of tasks in the process (i.e. six in this embodiment); and
$\emptyset$ is an empty set (i.e. states in which all observations are generated by the background B).

In other embodiments, multiple process structures or templates may be analysed. Thus, in such embodiments the state space X is expanded to include these templates, e.g.

$$X = \emptyset \cup R^{N_1+1} \cup R^{N_2+1} \cup \ldots$$

where $N_1$ refers to the number of tasks in a first process template, $N_2$ refers to the number of tasks in a second process template, etc.

Figure 5:
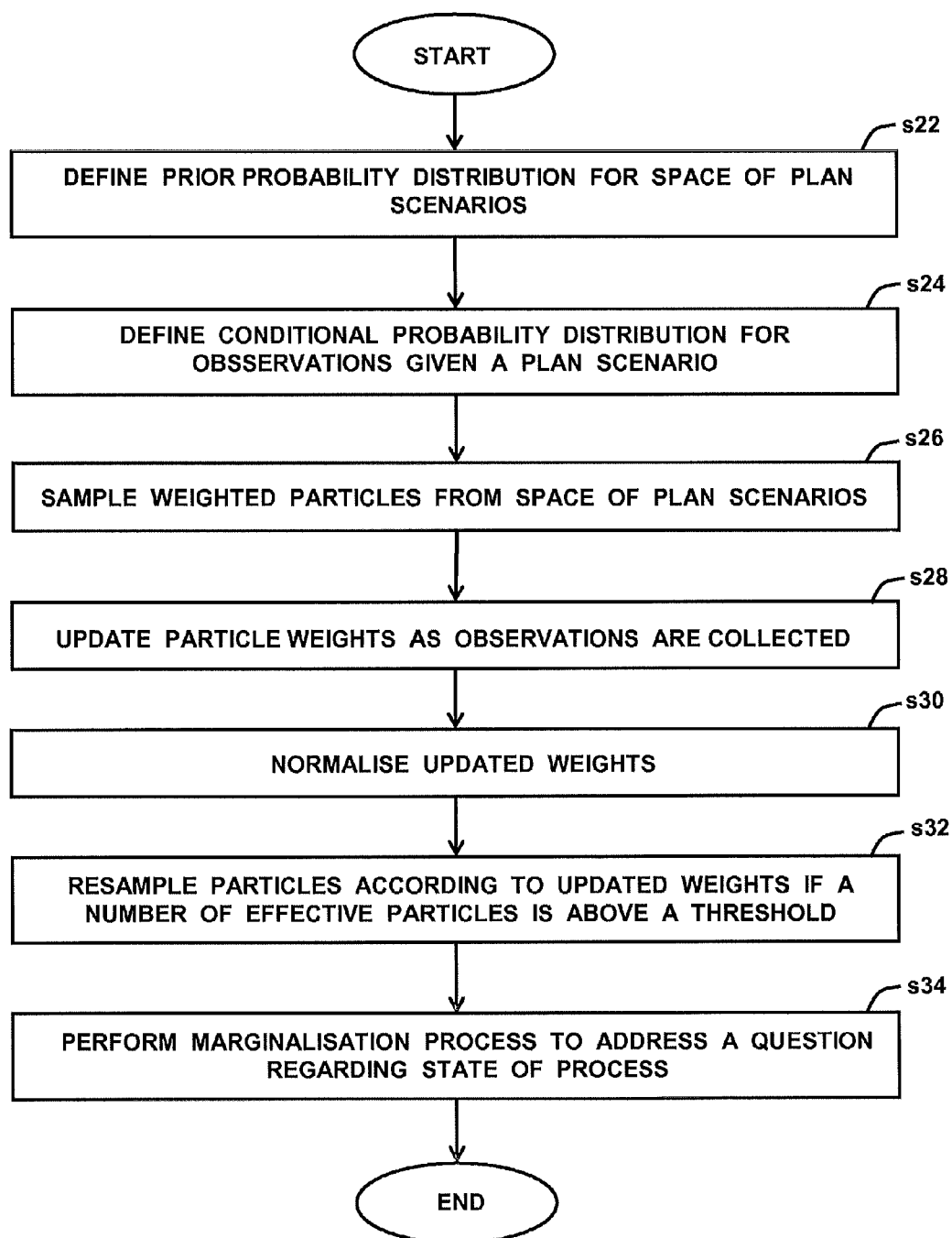
FIG. 5 is a process flow-chart showing certain steps of a process detection algorithm.

FIG. 5 is a process flow-chart showing certain steps of the process detection algorithm.

At step s22, a prior probability density function for the state space X, i.e. the probability distribution p(x), is defined. This prior distribution defines when it is believed that a process of attack preparation may start (if at all) and how long each of the tasks may take. This distribution is necessary to perform Bayesian inference over the state space X.

The prior probability density function p(x) captures any specific domain knowledge that is not captured in the structure of the process or observables. In this embodiment this includes when the process could be expected to start and how long may each task take. In this embodiment, the prior probability density function p(x) is deduced domain experts and/or historical data.

In this embodiment, there is a 50% chance that there will be no enemy process within a time period of interest, e.g. a two month period. Also, there is a 50% chance that an ambush preparation process could start according to a uniform distribution over the time period of interest.

In this embodiment, the internal task durations are modelled by separate prior distributions for each of the durations $d_1, \ldots, d_6$, where $d_i$ is the duration of the ith task. In other embodiments, the full joint distribution over $t_{start}, d_1, \ldots, d_6$ is modelled. Thus, in this embodiment the prior probability density function p(x) is given by:

$$p(x) = \begin{cases} 0.5 & \text{if } x = \emptyset \\ 0.5 p(t_{start}) p(d_1) p(d_2) \ldots p(d_6) & \text{otherwise} \end{cases}$$

where: $p(t_{start})$ is the probability distribution of the start time of the process. In this embodiment, this probability distribution has a uniform distribution over a two month period; and $p(d_i)$ is the probability distribution of the duration of the ith task. In this embodiment, the probability distributions $p(d_i), i=1, \ldots, 6$ each have a gamma distribution with an average equal to the duration of the relevant task (given above with reference to FIG. 3) and a variance of one day.

At step s24, a conditional probability distribution for an observation z being observed given a state x is defined, i.e. the probability distribution p(z|x) is defined.

A set of all the observation generated by the observables O1-O7, is given by:

$$O = \{o_1, o_2, \ldots, o_7\}$$

where $o_i$ is an observation corresponding to the ith observable.

An observation of an observable at a specific time $t_k$ is defined as $z_{t_k} \in Z$ where Z is the set of all possible observations:

$$Z = \emptyset \cup O = \{\emptyset, o_1, o_2, \ldots, o_7\}$$

where $\emptyset$ is an empty set and is used to model times at which no observations are made or are available.

The probability distribution p(z|x) encapsulates the dependency of an observation on the process tasks) and noise (dependency of an observation on the background B) in the system.

The signal component of the probability distribution p(z|x) is captured by specifying the probability (per unit time) that each observable in Z is generated by each given process task $T_j, j=1, \ldots, 6$, i.e. by determining values for p(z|T).

In this embodiment, the distribution p(z|T) is that specified in the following table:

|       | ∅    | $o_1$ | $o_2$ | $o_3$ | $o_4$ | $o_5$ | $o_6$ | $o_7$ |
|-------|------|-------|-------|-------|-------|-------|-------|-------|
| $T_1$ | 0.85 | 0.05  | 0.05  | 0.05  | 0     | 0     | 0     | 0     |
| $T_2$ | 0.95 | 0     | 0     | 0     | 0.05  | 0     | 0     | 0     |
| $T_3$ | 0.9  | 0     | 0     | 0.05  | 0     | 0.05  | 0     | 0     |
| $T_4$ | 0.95 | 0     | 0     | 0     | 0     | 0     | 0.05  | 0     |
| $T_5$ | 0.95 | 0     | 0     | 0     | 0     | 0     | 0     | 0.05  |
| $T_6$ | 0.9  | 0     | 0     | 0     | 0     | 0     | 0.05  | 0.05  |

The structure of the causal links between observables O1-O7 and the tasks T1-T6 described above with reference to FIG. 4, is captured by the sparse structure of this table. For example, in the above table the performance of the first task T1 (i.e. $T_1$) may generate an observation of the first, second, or third observables O1-O3 (each with a probability of 0.05 in this embodiment). However, the performance of the first task T1 (i.e. $T_1$) cannot generate an observation of the fourth, fifth, sixth, or seventh observables O4-O6 (i.e. $p(z=o_4|T=T_1)=p(z=o_5|T=T_1)=p(z=o_6|T=T_1)=p(z=o_7|T=T_1)=0$).

The noise component of the probability distribution p(z|x) is captured in a similar manner by specifying the probability of the observations given that they are generated by the background B i.e. by determining values for $p(z|x=\emptyset)$.

In this embodiment, the distribution $p(z|x=\emptyset)$ is that specified in the following table:

|   | ∅    | $o_1$ | $o_2$ | $o_3$ | $o_4$ | $o_5$ | $o_6$ | $o_7$ |
|---|------|-------|-------|-------|-------|-------|-------|-------|
| ∅ | 0.65 | 0.05  | 0.05  | 0.05  | 0.05  | 0.05  | 0.05  | 0.05  |

In other words, in this embodiment each observable may be generated by the background B with a probability of 0.05 (in each unit time step).

These probability distributions (i.e. p(z|T) and $p(z|x=\emptyset)$) are combined to generate a probability of an observation z when the underlying state is x (where x may be the null process, $x=\emptyset$, or a particular process scenario which includes the performance of the tasks T1-T6) i.e. a probability distribution p(z|x).

In this embodiment, the distribution p(z|x) is that specified in the following table:

|       | ∅    | $o_1$ | $o_2$ | $o_3$ | $o_4$ | $o_5$ | $o_6$ | $o_7$ |
|-------|------|-------|-------|-------|-------|-------|-------|-------|
| $T_1$ | 0.5  | 0.1   | 0.1   | 0.1   | 0.05  | 0.05  | 0.05  | 0.05  |
| $T_2$ | 0.6  | 0.05  | 0.05  | 0.05  | 0.1   | 0.05  | 0.05  | 0.05  |
| $T_3$ | 0.55 | 0.05  | 0.05  | 0.1   | 0.05  | 0.1   | 0.05  | 0.05  |
| $T_4$ | 0.6  | 0.05  | 0.05  | 0.05  | 0.05  | 0.05  | 0.1   | 0.05  |
| $T_5$ | 0.6  | 0.05  | 0.05  | 0.05  | 0.05  | 0.05  | 0.05  | 0.1   |
| $T_6$ | 0.55 | 0.05  | 0.05  | 0.05  | 0.05  | 0.05  | 0.1   | 0.1   |
| ∅     | 0.65 | 0.05  | 0.05  | 0.05  | 0.05  | 0.05  | 0.05  | 0.05  |

Note, in this embodiment, the above is an approximation, which is valid when $p(z \neq \emptyset | x) \leq 0.1$. In embodiments where this equation does not hold, the observation probabilities may be determined directly without separating them into signal and noise.

The network form of the process template 51 (as shown schematically in FIG. 4) represents the state space X (i.e. the space of all possible scenarios) of the process template 51. The state space X is shown in this form for the purposes of clarity and ease of understanding. This representation of the state space, in combination with the prior probability density function p(x) and the conditional probabilities p(z|x) defined above, provides a probabilistic model. As described in more detail later below with reference to steps s26 to s34, this probabilistic model is used to analyse preparation processes for a terrorist attack. In other embodiments, the state space for a process template may be represented in a different appropriate form, for example, the state space may be described solely as a series of equations. Furthermore, in other embodiments, the probabilistic model as a whole (i.e. the combination of the state space X, the prior probability density function p(x) and the conditional probabilities p(z|x)) may be provided in any appropriate form (e.g. solely as a series of equations).

At step s26, a set of sampled weighted particles is drawn from the state space X according to the prior probability p(x).

Firstly, a particle is drawn at random from the distribution over whether a process is underway or not, i.e. in this embodiment a particle will correspond to a process scenario with a probability of 0.5, and will correspond to no process with a probability of 0.5 as described above at step s22.

Secondly, if the sampled particle corresponds to a process scenario, a start time $t_{start}$ and set of task durations $d_1, \ldots, d_6$ are sampled for that particle from the prior probability distributions of $t_{start}$ and $d_1, \ldots, d_6$ respectively.

Thus, a set of particles is generated. Each particle represents either no process scenario or a process scenario (having specified start time and task durations).

The particles are each assigned a weight. Thus, the following set of sampled weighted particles is produced:

$$\{x_s, w_s\}_{s=1}^{N_s}$$

where: $x_i$ is the ith sampled particle;
  $w_i$ is the weight assigned to the ith sampled particle (initially these weights are set equal to $1/N_s$); and
  $N_s$ is the number of sampled particles (in this embodiment $N_s$ is equal to ten thousand).

At step s28, the particle weights are updated as observations are collected.

As a set of observations is collected, the sampled particles and their respective weights are updated. In this embodiment, this updating is performed sequentially as each new observation is collected.

The updating of the particles and their respective weights is performed such that the particles approximate a posterior probability density function for a state x given any observations z made of the observables O1-O7. In other words, updating of the particles is done such that values for the following probability distribution are determined:

$$p(x|z_{t1}, z_{t2}, \ldots)$$

where $z_{ti}$ is a value of an observation made at time $t_i$.

In this embodiment, the updating of particles and particle weights is achieved using Bayes' rule. Bayes' rule, applied to this embodiment, is as follows:

$$p(x|z_{t_1}, z_{t_2}, \ldots, z_{t_{k-1}}, z_{t_k}) = \lambda p(z_{t_k}|x) p(x|z_{t_1}, z_{t_2}, \ldots, z_{t_{k-1}})$$

where $\lambda$ is a normalisation constant. In this embodiment $\lambda = 1/p(z_{t_k}|z_{t_1}, z_{t_2}, \ldots, z_{t_{k-1}})$.

For the first iteration of s28, when no previous observations have been considered, the distribution $p(x|z_{t_1}, z_{t_2}, \ldots, z_{t_{k-1}})$ is given by the prior p(x).

In this embodiment, the observations $z_{ti}$ are conditionally independent given the attack preparation process. However, in other embodiments, this may not be the case. In these embodiments step s28 of updating the particles and particle weights may be modified in order to overcome any conditional dependencies between observables.

To perform this step of updating the particles and their respective weights, the set of samples $\{x_s^{k-1}, w_s^{k-1}\}_{s=1}^{N_s}$, which is distributed according to the current prior distribution $p(x|z_{t_1}, z_{t_2}, \ldots, z_{t_{k-1}})$ or p(x) if k=1, the samples are reweighted according to the observation likelihood:

$$w_s^k \propto w_s^{k-1} p(z_{t_k}|T(x_s^{k-1}, t_k))$$

where: $w_s^k$ is the weights of the sampled particles $x_s$ at time $t_k$;
  $w_s^{k-1}$ is the weights of the sampled particles $x_s$ at time $t_{k-1}$; and
  $T(x_s^{k-1}, t_k)$ is a task that is being executed at time $t_k$ if the true process state is described by $x_s^{k-1}$.

At step s30, the updated weights are normalised such that:

$$\sum_{s=1}^{N_s} w_s^k = 1$$

At step s32, the sampled particles are re-sampled according to the updated and normalised weights.

This re-sampling is performed to advantageously avoid degenerating to a single particle having a weight equal to one. This is produced by generating a new set of samples with uniform weight from the old set of weighted samples. However, because the re-sampling process can potentially remove useful particles, in this embodiment it is only carried out when a significant number of the particles have negligible weight. In this embodiment, this is performed by calculating the effective number of particles using the following formula:

$$N_{eff}^k = \frac{1}{\sum_{s=1}^{N_s} w_s^k}$$

where: $N_{eff}^k$ is the effective number of particles at time $t_k$.

The value of $N_{eff}^k$ is then comparing to a threshold fraction of the actual number of particles (e.g. one third). If the number of effective particles is below this threshold fraction, the re-sampling process is performed. If the number of effective particles is above the threshold fraction, the re-sampling process is not performed. The re-sampling process advantageously modifies each randomly selected particle by randomly generating a new set of durations for all the future tasks that have not yet been observed. This ensures the sample set has adequate variety.

The process of reweighting the samples (described at steps s28 and s30 above) followed by the re-sampling process (described at step s32 above) defines a recursive process that can advantageously be used to fuse any number of observables into the estimate. In addition, the process tends to be able to easily handle out of sequence and delayed data. A reason for this is that the recursive Bayesian filter does not utilise a prediction step.

The set of sample points and their associated weightings completely define the estimated progress of the (hidden) attack preparation process.

At step s34, one or more questions regarding the process, for example whether a process is being executed or how a process is progressing, are addressed using a marginalisation process.

In this embodiment, a marginalisation process is performed on the joint probability distribution of the state of the process.

This joint probability distribution is represented by the weighted particles. Thus, the marginalisation of the joint probability distribution comprises the summing of relevant particle weights (that have been normalised). For example, for a given time $t_i$, to determine the probability that the process has not started (i.e. is not currently being executed), the weights of the particles that correspond to no process (Ø) and processes that will start in the future ($t_{start} < t_i$) are summed. Similarly, the probability that a certain task, e.g. the second task T2, has not yet started, is underway, or has finished can also be calculated by summing the weights of those particles that correspond the relevant scenarios. For example, the probability that T2 is underway at a given time t is given by the sum of the weights of the samples x which have $t_{start} + d_1 < t < t_{start} + d_1 + d_2$. Similarly, the probability that T2 has not started can be found by summing the weights of the samples x which have $t_{start} + d_1 > t$ and those for which x=Ø. Also, the probability that T2 has finished can be found by summing the weights of the samples x which have $t_{start} + d_1 + d_2 < t$.

To perform this whole inference process involving the estimating the state of the process, the full observation model p(z|x) is not explicitly required. This is because each operation only needs the un-normalised likelihood, which is proportional to p(z|x). This means that the full table p(z|x) does not necessarily need to be explicitly constructed. All that is required is the ability to construct the unnormalised likelihood of the tasks for all the observables z that are actually obtained. The data (represented by the observables z), whether it be collected from ELINT, HUMINT, text, video, etc, needs to be converted into a probabilistic likelihood over which of the tasks (and the background B) could have generated it. This could be performed by a human analyst on an individual basis, or if operating within a larger data processing system be generated from some predefined template models.

A step of making more observations, and the steps of updating particle weights as these observations are made (step s28), normalising the updated weights (step s30), resampling the particles according to the updated weights if the number of effective particles is above a threshold (step s32), and performing a marginalisation process (step s34), may be repeated. This advantageously allows information from multiple observations, e.g. observations taken at different, to be combined, thereby tending to increase the validity of any conclusions reached when performing the above described method.

Thus, a process detection algorithm is provided.

The present invention addresses a problem of detecting the execution of attack preparation processes carried out in partially observable and cluttered environments. In this embodiment, a process to be detected comprises a series of tasks that are executed in a known order and build toward some final event. The process detection algorithm advantageously tends to allow for the detection of the execution of the tasks of the process from the available ambiguous and incomplete data before it reaches the terminal event. This has been accomplished using a Monte Carlo inference algorithm.

Moreover, the process detection algorithm is capable of estimating a belief that the process is being executed and how much progress has been made from the available ambiguous and incomplete data.

An optional additional process to examine the performance of the algorithm and how well it can classify between the situation in which a process is underway and the situation in which a process is not underway, may be incorporated into the process detection algorithm. In certain embodiments in which the ability of the algorithm to be able to differentiate between process activity and no process activity is determined, the inference algorithm (described above at step s34) is a binary classifier that indicates whether a process is currently being executed (one) or not (zero). A receiver operator characteristic (ROC) curve is used to describe the performance of the binary classifier by plotting the rate of false positives vs. true positives. The curve is generated by varying the decision threshold that converts the degree of belief into the binary decision of a value of one or a value of zero.

In the above embodiments, the process detection algorithm updates particle weights using observations that are collected in the time-steps up-to-and-including a present time step. This advantageously tends to provide, for example, a probability that a process is presently being executed, or an estimate of at what points in time certain of the tasks were completed or underway. However, in other embodiments the process detection algorithm may comprise updating particle weights such that the updated weights correspond to a future point in time. This advantageously tends to provide a prognostic probability to find, for example, the mostly likely time that a process is completed.

In the above embodiments, the process to be detected or otherwise analysed comprises six distinct tasks. These tasks have specific average lengths as described above with reference to FIG. 3. However, in other embodiments a process to be detected or otherwise analysed may comprise a different number of tasks. Moreover, the durations of any of the tasks may be different to those described above. Also, the tasks may be arranged differently with respect to one another, i.e. the tasks may have a different configuration in a Gantt chart to those described above with reference to FIG. 3.

In the above embodiments, the tasks of the process may lead to observations of any of seven observable random variables. However, in other embodiments there are a different number of observable random variables related to the tasks. Moreover, observations of each of the observable random variables may be generated by the performance of any of the process tasks.

In the above embodiments, the background activity may give rise to observations of any of the observable random variables. However, in other embodiments the background activity may give rise only to observations of some of the observable random variables.

In the above embodiments, the prior probability density function for the state space X, i.e. p(x), is defined by there being a 50% chance that there will be no attack preparation process carried out by the enemy within a time period of interest, and a 50% chance that an attack preparation process will start. However, in other embodiments this prior probability distribution is defined to be a different appropriate distribution.

In the above embodiments, the prior probability distribution of the start time of the attack preparation process, i.e. $p(t_{start})$, has a uniform distribution over a two month period. However, in other embodiments this prior probability distribution is defined to be a different appropriate distribution.

In the above embodiments, the prior probability distribution of the duration of the each task, i.e. $p(d_i)$ for i=1, ..., 6, is a gamma distribution with an average equal to the average duration of the relevant task and a variance of one day. However, in other embodiments one or more of these prior probability distributions is defined to be a different appropriate distribution.

In the above embodiments, the conditional probability distribution p(z|x) is defined to be that defined above at step s24 of the description of the plan detection algorithm. However, in other embodiments this conditional probability distribution is defined to be a different appropriate distribution.

In the above embodiments, inference over the state of the process is performed using a Monte Carlo inference algorithm (i.e. using samples of weighted particles). However, in other embodiments such inference is performed using a different appropriate algorithm.

It should be noted that certain of the process steps depicted in the flowchart of FIG. 5 and described above may be omitted or such process steps may be performed in differing order to that presented above and shown in FIG. 5. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the process that is analysed is that of terrorists preparing an attack. By virtue of the nature of the process, the party performing the analysis, i.e. the party implementing the process analysis system, is not able to fully observe or detect all elements of the process, does not know all the intended steps or elements of the process or their timings, and/or does not know whether the process is actually underway e.g. the process is performed in a partially observable, and cluttered, environment. However, in other embodiments, the process to be analysed may be different to those described above. For example, in other embodiments the process to be analysed may be hidden to the analysing party to a different extent and/or observations may be affected by different levels of noise that may arise from one or more different sources. Moreover, in other embodiments, the process being analysed may be observable to a different extent and/or for different reasons. Also, in other embodiments, the process being analysed may be in a cluttered environment to a different extent and/or for different reasons. Merely by way of example, such processes may include a process leading to an avalanche, a process leading to the failure of a critical component in an aircraft or power station, a process leading to a dangerous crowd concentration or crowd movements at a sporting event, and a competitive analysis process in which a company may analyse activities of a competitor.

The invention claimed is:

1. A method of analysing a process, the method comprising:
   generating a process template;
   determining a probabilistic model of the process using a plurality of prior probability distributions, the probabilistic model specifying the process template, wherein the probabilistic model comprises:
      a plurality of task nodes, the task nodes being nodes for tasks of the process as specified by the process template;
      a plurality of observables nodes, the observables nodes being nodes for observables that may be caused by performance of the tasks; and
      a background activities node; wherein one or more of the observables may further be caused by background activities of the background node,
      and wherein determining the probabilistic model for the process template further comprises specifying at least two of a prior probability distribution for a starting point of the process, a prior probability distribution for each task node, a prior probability distribution for the background activities node, and a prior conditional probability distribution for each of the observables nodes;
   measuring values of an observable corresponding to one of the observables nodes; and
   updating a probabilistic estimate of a process state using the measured values.

2. A method according to claim 1, wherein the updating of the probabilistic estimate of the process state is performed to estimate a probability that the measured values are caused by the performance of a certain task and/or the background activities.

3. A method according to claim 1, wherein the updating of the probabilistic estimate of the process state is performed to estimate whether or not the process has begun given the measured values.

4. A method according to claim 1, wherein the step of updating of the probabilistic estimate of the process state is performed to estimate which task is being performed at a time when the measured values are measured.

5. A method according to claim 1, wherein, starting of at least one of the tasks required requires another task is completed.

6. A method according to claim 1, wherein the updating of the probabilistic estimate of the process state is performed with a process of Bayesian inference.

7. A method according to claim 6, wherein the process of Bayesian inference is performed using a Monte Carlo inference algorithm.

8. A method according to claim 1, wherein:
   a prior probability distribution for a start point of the process is a probability distribution for the process starting over a time period of interest; and
   a prior probability distribution for a task node is a probability distribution for a duration of a task corresponding to the task node.

9. A method according to claim 1, wherein the prior probability distribution for the background activities node is a probability that the background activities are taking place over a time period of interest and a duration of the process.

10. A method of analysing a process according to claim 1, comprising;
    performing the method of claim 1, for a plurality of different process templates.

11. A method according to claim 10, comprising:
    comparing resulting probabilities obtained from performing the method of claim 1 for at least two of the different process templates.

12. The method of analysing a process according to claim 1, wherein updating a probabilistic estimate of a process state estimate further comprises determining overall progress of the process based on the measured values and the modelled internal task durations of the probabilistic model.

13. An apparatus for analysing a process, comprising:
    one or more processors adapted to update a probabilistic estimate using measured values of observables and a probabilistic model, wherein the probabilistic model is determined based on a plurality of prior probability distributions, and wherein the probabilistic model comprises:
       a plurality of task nodes, the task nodes being nodes for tasks of the process as specified by a process template;
       a plurality of observables nodes, the observables nodes being nodes for observables that may be caused by performance of the tasks; and a background activities node, wherein one or more of the observables may further be caused by the background activities of the background activities node, wherein the determined probabilistic model comprises at least two of a prior probability distribution for a starting point of the process, a prior probability distribution for each task node, a prior probability distribution for the background activities node, and a prior conditional probability distribution for each of the observables nodes.

14. A non-transitory machine-readable medium having instructions encoded thereon, the instructions when executed by a computer system having one or more processors, will cause the computer system or the one or more processors to:

generate a process template;

determine a probabilistic model of the process using a plurality of prior probability distributions, the probabilistic model specifying the process template, wherein the probabilistic model comprises:

a plurality of task nodes, the task nodes being nodes for tasks of the process as specified by the process template;

a plurality of observables nodes, the observables nodes being nodes for observables that may be caused by performance of the tasks; and a background activities node; wherein one or more of the observables may further be caused by background activities of the background node, and wherein determining the probabilistic model for the process template further comprises specifying at least two of a prior probability distribution for a starting point of the process, a prior probability distribution for each task node, a prior probability distribution for the background activities node, and a prior conditional probability distribution for each of the observables nodes;

measure values of an observable corresponding to one of the observables nodes; and update a probabilistic estimate of a process state using the measured values.

* * * * *